No. 828,633. PATENTED AUG. 14, 1906.
J. STUART.
STOP BLOCK FOR WAGONS.
APPLICATION FILED DEC. 29, 1904.

WITNESSES
Chas. R Hoyle
Penelope Comberbach.

INVENTOR
JOHN STUART
BY Rufus B. Fowler
ATTORNEY

THE NORRIS PETERS CO., WASHINGTON, D. C.

UNITED STATES PATENT OFFICE.

JOHN STUART, OF WORCESTER, MASSACHUSETTS.

STOP-BLOCK FOR WAGONS.

No. 828,633.     Specification of Letters Patent.     Patented Aug. 14, 1906.

Application filed December 29, 1904. Serial No. 238,739.

*To all whom it may concern:*

Be it known that I, JOHN STUART, a citizen of the United States, residing at Worcester, in the county of Worcester and Commonwealth of Massachusetts, have invented a new and useful Improvement in Stop-Blocks for Wagons, of which the following is a specification accompanied by drawings, forming a part of the same, in which—

Figure 1:
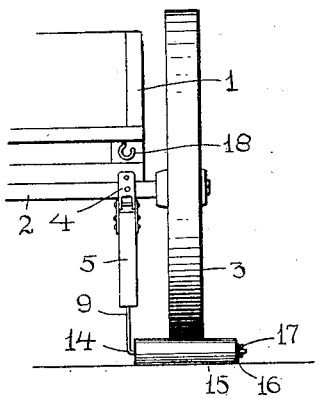
Figure 4:
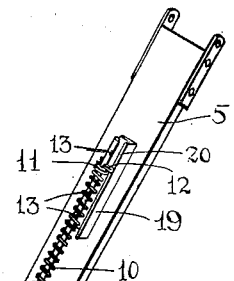
Figure 2:
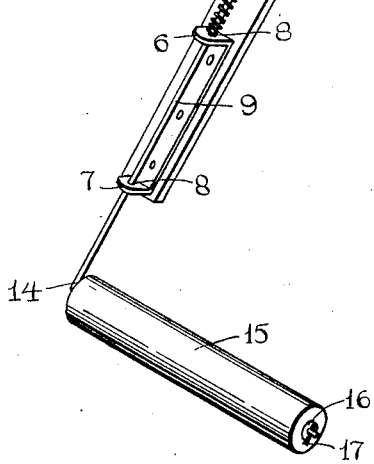
Figure 2:
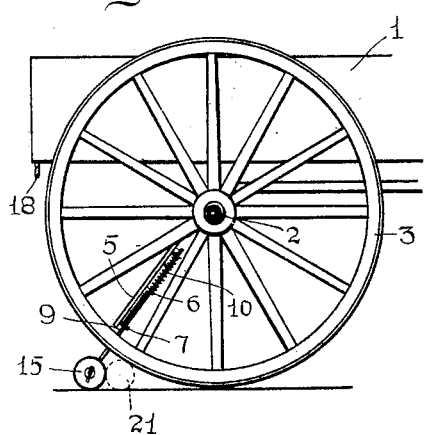
Figure 3:
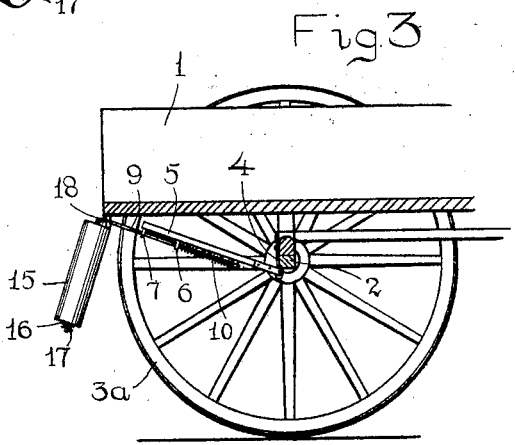

Figure 1 is a rear view of my improved stop-block in its operative position upon a wagon. Fig. 2 is a side elevation showing the block upon a wagon in its operative position. Fig. 3 is a side elevation in sectional view showing the block in its operative position upon a wagon; and Fig. 4 is a detached view of my improved stop-block, shown in perspective.

Similar reference-figures refer to similar parts in the different views.

This invention relates to devices adapted for attachment to wheeled vehicles, so as to travel behind one or more of the wheels on the ground and to check the backward motion of the vehicle.

My invention is especially designed for use upon grades to hold the vehicle and prevent backward motion.

I accomplish these objects by providing a roller pivotally supported from the axle or body part of the vehicle with means for preventing displacement of the stop-block from its position behind the wheel by inequalities in the traveled surface, and also means for immediately advancing the roller into contact with the wheel when the vehicle stops.

The object of my invention is to obtain a roller stop-block which may be conveniently and quickly brought into an operative position and one that will be prompt and efficient in blocking the backward movement of the vehicle.

Referring to the accompanying drawings, 1 denotes a portion of the body of a wagon, 2 the axle, and 3 and 3ª the rear wheels. Pivotally attached to a plate 4 on a fixed portion of the wagon, such as the axle 2, inside of and near the wheel 3, is a bar 5, projecting from which are lugs 6 and 7, having holes 8, in which slides a rod 9. The rod 9 is surrounded above the lug 6 by a spiral spring 10, one end of which bears against the lug 6 and the other against a washer 11, held on the rod 9 by a cotter-pin 12, inserted through one of a series of holes 13 in the rod 9, by which the length of the spring can be varied to regulate its tension.

The end 14 of the rod 9 is bent at right angles, and a roller 15 is held upon its horizontal portion by a washer 16 and cotter-pin 17. When the device is not in use, it is hung upon a hook 18, attached to the wagon-body 1. The bar 5 is also provided with a right-angled plate 19, which acts as a stop for the cotter-pin 12, thereby preventing the complete rotation of the rod 9 and displacement of the roller 15 by obstructions in the path of the roller.

The operation of my device is as follows: When it is desired to prevent backward movement of the wagon, the rod 9 is unhooked and the roller 15 is placed upon the ground behind the wheel 3. The tension of the spring 10 is regulated by the adjustment of the washer 11, so that resistance of the roller 15 in passing over the ground will compress the spring 10, thereby tending to keep the roller 15 always at a distance from the wheel, so it will not scrape mud or dirt from the wheel. The roller 15 is held from displacement from its proper position behind the wheel 3 by contact of the cotter-pin 12 with the projecting edge 20 of the right-angled plate 19. If the forward movement of the wagon ceases, the action of the spring 10 draws the roller 15 along the ground into contact with the wheel 3 into the position shown by the dotted line 21, Fig. 2, and any backward movement of the wheel 3 is checked at once. In the adjustment of the spring 10 only enough tension must be given to it to bring the roller into contact with the wheel upon the stopping of the wagon, when the friction upon the ground ceases. The spring 10 should not exert a pull strong enough to hold the roller continually in contact with the wheel when the vehicle is in motion.

What I claim as my invention, and desire to secure by Letters Patent, is—

1. A stop-block for wagons, consisting of a bar pivotally attached to a fixed portion of the wagon, means for checking the backward movement of the wagon-wheel by contact therewith, and a spring-actuated rod carrying said means and slidably attached to said bar.

2. A stop-block for wagons consisting of a bar pivotally attached to a fixed portion of the wagon, a roller for checking the backward movement of the wagon-wheel and a spring-actuated rod carrying said roller and slidably attached to said bar.

3. A stop-block for wagons consisting of a bar pivotally attached to a fixed portion of the wagon, lugs carried by said bar, a rod sliding in said lugs, a spring bearing against one of said lugs and operatively connected with the rod, and a roller carried by said rod for checking the backward movement of the wagon-wheel.

4. In a stop-block for wagons, the combination with a bar pivotally attached to a fixed portion of the wagon, means for checking the backward movement of the wagon-wheel by contact therewith, a rod carrying said means and slidably attached to said bar, and means for preventing the complete revolution of said rod.

5. In a stop-block for wagons, the combination with a bar pivotally attached to a fixed portion of the wagon, means for checking the backward movement of the wagon-wheel, lugs carried by said bar, a spring-actuated rod carrying said means and sliding in said lugs, a stop-plate attached to said bar, arms projecting from said rod and adapted to engage said plate, thereby preventing the complete revolution of the rod.

Dated this 27th day of December, 1904.

JOHN STUART.

Witnesses:
RUFUS B. FOWLER,
ROY D. TOLMAN.